United States Patent [19]

Smith et al.

[11] Patent Number: 5,061,354

[45] Date of Patent: Oct. 29, 1991

[54] METHOD AND REACTION FOR SUSTAINING HIGH ENERGY REACTIONS

[76] Inventors: Robert E. Smith, 1263 Emory St., San Jose, Calif. 95126; Ami E. Berkowitz, 2640 Long Boat Cove, Del Mar, Calif. 92014

[21] Appl. No.: 338,055

[22] Filed: Apr. 14, 1989

[51] Int. Cl.$^5$ .......................... H05F 7/07; B01J 19/08
[52] U.S. Cl. ................................. 204/164; 422/186.04
[58] Field of Search ........... 204/165, 164, 156, 157.15, 204/157.4, 157.44; 422/186.04, 186.21, 186.26

[56] References Cited

U.S. PATENT DOCUMENTS

| | | | |
|---|---|---|---|
| Re. 28,564 | 9/1975 | Inoue | 204/129.2 |
| 2,399,951 | 5/1946 | Suits | 422/186.29 |
| 3,355,279 | 11/1967 | Ishibashi | 75/345 |
| 3,404,078 | 10/1968 | Goldberger | 204/164 |
| 3,491,015 | 1/1970 | Naff | 204/298.41 |
| 3,880,743 | 4/1975 | Lang | 204/165 |
| 4,303,961 | 12/1981 | Wydeven et al. | 361/230 |
| 4,416,751 | 11/1983 | Berkowitz et al. | 204/165 |
| 4,759,905 | 7/1988 | Walter et al. | 419/23 |
| 4,948,485 | 8/1990 | Wallsten et al. | 204/164 |

*Primary Examiner*—Brooks H. Hunt
*Assistant Examiner*—Daniel James Jenkins
*Attorney, Agent, or Firm*—Robert Samuel Smith

[57] ABSTRACT

A liquid dielectric having a surface that is contacted by an end of an electrode so as to form a contact area between the electrode and dielectric liquid wherein said area is limited thereby providing a contact resistance that is large compared to the rest of the electrode and dielectric liquid. Current through the contact area causes local heating of the electrode at the contact and raises its temperature toward the melting point of the electrode. Heating causes an increase in resistance of the electrode region so that the area of contact can be increased further immersion of the electrode. The contact area becomes a high-energy region where high energy reactions can be sustained such as fusion and the erosion of the electrode to generate powder having a very fine particle size. When the intention is to generate powders, compounds may be dissolved in the liquid containing elements that combine with the eroding surface of the electrode to provide particles having a stoichimetric ration that depends on the concentration of the dissolved compound. In this manner, finely divided particles of Ba Ferrite are generated using an iron electrode and Barium Hydroxide dissolved in water.

5 Claims, 1 Drawing Sheet

METHOD AND REACTION FOR SUSTAINING HIGH ENERGY REACTIONS

BACKGROUND

1. Field of the Invention

This invention relates to a method for producing a region of high energy capable of sustaining reactions that require high energy such as fusion and the production of powders characterized by very fine particle size and selected composition and in particular to a method involving high voltage discharge generated on an electrode surface in a dielectric liquid.

2. Prior Art

Efforts to generate regions of high energy on the surfaces of electrodes to support reactions requiring high energy have been motivated by interest for many applications—such as the generation of powders, fusion, etc. Motivation for generating powders have included applications in catalysis, magnetic recording media, jet fuel, metallurgy, ceramics, printed circuits, etc.

The prior art technology of generating powders of materials, e.g., metals and metal compounds, includes precipitation from solution, decomposition of gases, gas-water atomization, evaporation techniques, spark erosion, etc. An important objective in all of this activity is to produce particles characterized by small size.

Spark erosion is a technique whereby an electric current is passed between surfaces of material to be eroded resulting in a spark discharge that erodes the surfaces. The electrodes may be immersed in a dielectric such as distilled water or a hydrocarbon which may or may not react with the products of the discharge to produce a compound whose composition is different from that of the reacting surfaces.

Two general approaches to the technology of spark discharge have been disclosed.

One approach (see U.S. Pat. No. 3,355,279) discloses an apparatus comprising two electrodes between which are many chunks of material having the same composition as the electrodes. Electrodes and chunks are immersed in a liquid dielectric such as distilled water or hydrocarbon. A voltage is impressed between the electrodes while the electrodes and chunks are agitated. The jostling causes the chunks and electrodes to make and break contact with one another so as to generate sparks. Generation of sparks cause erosion of the chunks and electrodes. to form a powder. By selecting the appropriate composition of chunks, electrodes and dielectric liquid, particles can be formed that are not only very small, but which also have compositions that depend on sparking conditions and composition of the dielectric and material being eroded.

Influence of sparking conditions and electrode material on particle size, composition and crystal structure is discussed in "Spark Erosion" by A. Berkowitz et al published in the Journal of Material Research 2 (2) Mar. 1987. For example, U.S. Pat. 3,355,279 discloses formation of aluminum oxide powders by spark erosion of aluminum electrodes in water.

Another approach involves an apparatus in which the surfaces of two electrodes are immersed in a dielectric and maintained in very close proximity to one another by servo means so as to sustain a continuous arc and thereby erode the surfaces to produce the fine powder. See "RESA—A wholly New Process for Fine Oxide Powder Preparation" published in the Journal for Materials Research, 3 (6) Nov., 1988.

Additional references include U.S. Pat. No. 4,416,751 which discloses production of a ferro fluid by spark discharge; U.S. Pat. No. 4,759,905 which discloses a "Method for Fabrication of Low Cost Finely Divided Si-Ge."

Powder technology has been an essential element for developing media for magnetic recording. For many years, recording films have been made by mixing ferrite powders with a precured resin, spreading the coating onto the appropriate substrate (disk or tape), heat curing the film, polishing the film to a required thickness. The powders are produced by chemical precipitation which generally comprises mixing an aqueous solution of an iron salt such as ferric chloride with a base such as sodium hydroxide to precipitate finely divided ferrous hydroxide. The powder is then washed to remove the sodium salt. The product at this point is a hydrate of ferrous or ferric oxide which is nonmagnetic. To convert the powder to the magnetic phase, the powder is calcined in a reducing atmosphere at a temperature generally above 500° C. to drive off the waters of hydration and convert the powder to the magnetic phase. The calcining step presents the problem that the particles tend to coagulate during the heat-dehydration process.

One of the important advances in the art of generating magnetic powders of iron oxide has been the discovery that the incorporation of controlled amounts of various metal ions into the ferrite lattice results in particles that have greatly improved properties for magnetic recording. A principle result has been an increase in coercive force, the magnetic field required to remagnetize the particle. Incorporation of various metal constituents,(e.g., Co) has been accomplished by adding the appropriate salt, e.g., CoC1, to the solution for coprecipitation of iron and cobalt to produce a Cobalt containing iron oxide.

The addition of Barium has been especially effective for increasing coercive force. For example, Ferrites containing no metal ions other than iron typically have a coercive force of 300 oe. Addition of Barium in an amount equal to 1:12 can increase coercive force to above 1000 oe.

Another important property for recording powder particles is particle shape and size. In particular, coercive force is increased by reducing particle size. Present production methods produce particles in the range of 100 to 300 nanometers having generally acicular shape. Magnetic powders characterized by a range of size and acicular shape present a range of coercive forces rather than a discrete value so that the bit information storage density capability of a coating made with such particles is limited.

In view of the above, a process for producing Barium Ferrite has been developed which involves growing the particles in a flux then washing away the flux.

The techniques of spark erosion to produce powders has a number of advantages over competing techniques such as precipitation methods. One advantage is that the process is much simpler since the problem of removing products of reaction such as sodium chloride is avoided. Furthermore, in some applications, the necessity of having to calcine is avoided. Production of powders having particle size smaller than the other techniques is often achieved.

However, in many instances, a specific composition of powders which are alloys or combinations of metal oxides is difficult to achieve using spark erosion. The problem results from preferential volatilization of a particular species of atom which results in loss of one constituent from an electrode at a faster rate than loss of a second constituent. The result is an ever changing composition of both the composition of the electrode and powder formed thereby.

For example, during the course of reduction to practice of this invention, Barium Ferrite powder was generated by spark erosion using electrodes and chunks of barium ferrite formed by sintering compacts of coarse particles whose initial composition was 12 to one atomic ratio of iron to barium. Samples of powder were made using a range of discharge voltages from 150 to 500 volts discharging capacitors ranging from one to ten microfarads. Chemical analysis showed that the atomic ratio of Iron to Barium ranged from four to one up to nine to one indicating that the barium volatilized from the original ferrite at a greater rate than the iron.

Another problem with prior art methods of spark erosion is the wide range of particle size that is generated. In the work discussed in the foregoing paragraph, particle size ranged from micron size down to a few hundred Angstroms so that expensive separation techniques are required to remove the larger particles from the powder charge in order to obtain a powder that is satisfactory for magnetic recording.

THE INVENTION

Objects

It is an object of this invention to generate a high energy region on the surface of an electrode to sustain reactions requiring high energy such as fusion and production of fine powders.

It is an object of this invention to generate a powder of particles having a particle size in the submicron range with larger particles being absent.

It is another object of this invention to generate a powder in which the particles have a controlled atomic ratio of constituents.

It is another object of this invention that the method of production be amenable to mass production techniques in terms of the period of time that the process can be operated.

It is still another object of this invention to provide an apparatus that is capable of carrying out the objects of this invention.

It is yet another object of this invention that the process for producing the powders be applicable to a large number of compounds.

Still another object of this invention is to produce Barium Ferrite powder in which the average particle size ranges from 100 to 5000 Angstroms.

Another object of this invention is produce Barium Ferrite powder in which the atomic ratio of Ba to Fe is 1 to 12.

SUMMARY

The successful operation of this invention is based on two innovations.

The first innovation is the construction of an apparatus and method of use in which the electrical resistance of the interface region between an electrode and dielectric liquid is large compared to the resistance of regions of the electrode and dielectric liquid that are adjacent to the interface. The result of this condition is that when an electrical current is passed through the electrode a very high field region is established at the interface and the electrode in the region of the interface heats to a temperature that can approach the melting temperature of the electrode. This condition results in an increase of resistance of the electrode region adjacent to the interface and permits further immersion of the electrode to the extent that the contact area increases to a practical value.

The second innovation which is required in reactions such as those involving stoichiometric combination of the electrode element and elements dissolved in the dielectric medium is the method of maintaining stoichiometry by maintaining a constant concentration of dissolved compound in a suitable dielectric and spark eroding using a voltage that is high enough to minimize reduction of efficiency of spark formation. In accordance with this practice, the electrodes are composed of a single element that is different than the dissolved ions. The ion concentration is maintained constant by adequate agitation and additions of the desired ions so the dielectric liquid composition is always constant. Therefore the composition of the powder is always constant.

In accordance with the practice of this invention, one construction comprises means to initially position an elongated electrode so that a tip of the electrode contacts the surface of the dielectric liquid. The dielectric is rendered conductive by dissolving a suitable compound therein. A voltage is applied so as to pass a large current through the interface between the electrode and the dielectric.

Under these conditions, a region at the end of the electrode that is touching the surface of the dielectric approaches its melting temperature and the resistance of this region increases substantially. As this occurs, a larger volume of the electrode can be immersed in the liquid and a corresponding larger volume of the electrode approaches the melting temperature to the point where the end of the electrode assumes a spherical shape and the contact area grows to a larger more practical size even though the rest of the electrode is at a much lower temperature. The liquid adjacent to the interface in the vicinity of the electrode does not reach a vapor state by virtue of the fact that the liquid is circulating. The interface between the electrode and the dielectric is a region of intense activity where reactions can occur requiring high energy. Such reactions include volatilization of the dielectric and erosion of the surface of the molten tip of the electrode to form a powder in the dielectric which is a compound or alloy of the ionic and electrode species.

DRAWINGS

Figure 2:
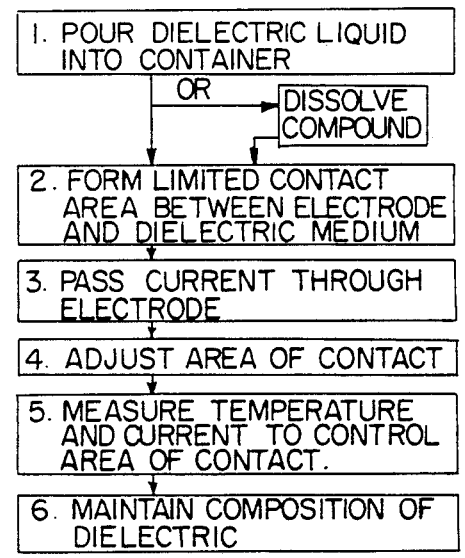

FIG. 2 lists the steps in the method of this invention.

DESCRIPTION OF A PREFERRED EMBODIMENT

Figure 1A:
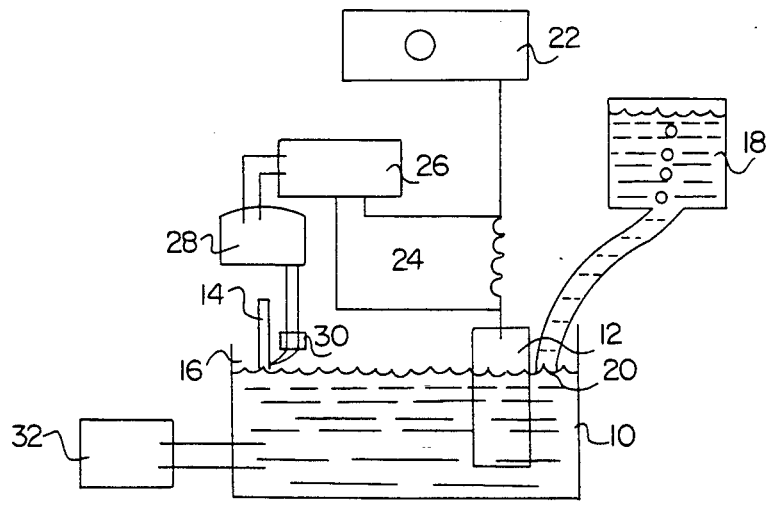
FIG. 1 is a schematic of the apparatus used to practice the method of this invention.
FIG. 1b is a detailed schematic of the reaction zone.
Figure 1B:
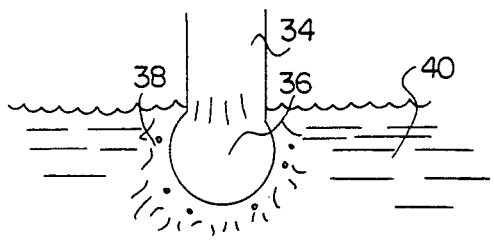

Turning now to a description of a preferred embodiment including an example there is shown in FIG. 1 an apparatus that is constructed to perform the method of the invention. There is shown a vessel 10 containing a dielectric. An appropriate compound is dissolved in the dielectric. There is also shown a "passive" electrode 12 immersed in the dielectric and an "active" electrode 14 with a small area 16 of surface in contact with the surface of the dielectric. A second vessel 18 is inverted with an opening 20 positioned on the surface of the dielectric in the first vessel so that it functions as a reservoir to maintain a constant level of dielectric in the first vessel. The passive electrode is connected to a high voltage power supply 22 through a sensing resistor 24. The voltage across the sensing resistor is fed to a voltage comparator 26. An actuator 28 receives the signal from the comparator and also a signal from a thermal sensor that measures the temperature in the vicinity of the contact area. The actuator controls and maintains the position of the active electrode at the surface of the dielectric. As the region of the active electrode close to the electrode-liquid interface heats up, the active electrode is moved toward the dielectric by the actuator so as to increase and maintain a larger more practical size of the contact area. There is also shown a means 32 to maintain a constant concentration of ionic species dissolved in the dielectric. A number of devices and techniques may be employed which are well known in the art and all of them are embodiments when used in the present context. A very simple means of controlling the concentration is by measuring conductivity (such as can be done with a Hach Conductivity Meter 32) and making additions of compound to maintain a constant value.

When a high voltage is initially applied between the end surface of the electrode in contact with the dielectric, sparking occurs causing the end of the electrode to become heated. Within approximately a minute, the end of the electrode becomes "red hot". The end of the electrode becomes molten to the extent that a glowing ball forms on the end of the electrode. The glowing ball can be immersed in the dielectric and still maintain its glowing hot state indefinitely. Maintenance of the glowing ball is achieved by virtue of the conductivity of the molten ball being much lower than the rest of the electrode and because the gaseous interface presents a higher resistance than the surrounding dielectric medium.

The conditions that are established at the electrode-dielectric interface are illustrated in FIG. 1a. Region 34 is the main region of the electrode. Heated region 36 is the region adjacent to the high energy contact area 38 which is surrounded by the dielectric liquid 40.

Contrary to the practice of this invention, if the electrode were to be plunged into the dielectric and voltage applied, the dielectric is simply heated through its entirety and the afore described "molten ball" effect and attendant high energy interface does not occur.

The method in accordance with the practice of this invention is illustrated by the flow diagram of FIG. 2.

The first step listed is to dissolve a compound into a dielectric liquid wherein the compound contains a combining element composing the powder to be produced.

The second step is to position an electrode so that the electrode contacts the dielectric liquid to establish a contact area.

The third step is to pass current through the electrode.

The fourth step is to monitor temperature and current so as to continually adjust the position of the electrode to increase the area of contact to a practical value.

The fifth step is to maintain the composition of the dielectric liquid by making appropriate additions of compound to the dielectric liquid.

In applications involving the generation of powder, the particle size of the powder that is generated is typically submicron and does not contain the larger particles that are generated by sparking that occurs with electrode to electrode contact make and break as practiced by the prior art. This is probably due to the fact that a large concentration of energy occurs with the breaking of the contact whereas in the "molten ball" scenario, there probably is not a highly localized current surge with sufficient energy to break away larger particles but rather a more uniform distribution of discharge energy over the surface of the glowing ball which can break away the finer particles by virtue of the fact that the ball is very hot and not much additional energy is required to volatilize the surface of the electrode.

In order to demonstrate the method of this invention and illustrate the features thereof, an apparatus as described in the foregoing paragraphs was constructed in which the passive electrode was an iron rod having a diameter of one half inch. The active electrode was another iron rod having a diameter of one eighth inch. The dielectric liquid was a saturated aqueous solution (at room temperature) of Barium Hydroxide corresponding to a concentration of 6 gms per 100 ml. An electric potential of 500 volts was applied between the electrodes so as to establish the conditions previously described and causing a fine powder to form in the dielectric. The powder was magnetic indicating that the powder was not a hydrate as might be expected in view of the recitations of the prior art. Examination of the powder in the electron microscope showed that the particle size was 10 to 100 nanometers. The atomic ratio of Barium to Iron was one to twelve. The particle size and composition recommend the use of this powder as an outstanding particulate for magnetic recording media.

An essential feature of this invention is establishment of an area of high energy at the interfacial region between an electrode surface and a dielectric liquid by passing current through the region while limiting the flow of heat from the region. The method and apparatus described herein is applicable to sustaining numerous applications requiring these conditions. For example, one application is to sustain fusion type reactions where a dielectric containing, e.g., deuterium is used with Palladium electrodes. In accordance with the method of this invention, an area of the palladium electrode is brought into contact with the dielectric whereby the area is small enough that the contact resistance of the electrode-dielectric interface is large compared to the resistance of the electrode and dielectric. With the electrode being negative, current is passed through the interface causing the interface region to heat up. Typical voltage applied could be above 100 volts. The rising temperature at the interface causes the resistance of the electrode in this region to dielectric and increase the area of the interface. The region at the interface contains high energy deuterium ions which would be expected to support a fusion reaction.

One arrangement has been described by which a high energy region at an electrode surface can be generated for the purpose of supporting reactions that require high energy. Other arrangements are suggested by studying the drawings and the description of a preferred embodiment such as an electrode subject to a means of localized cooling that would establish the thermal gradient achieved by the method described above. These alternate methods are within the scope of this invention.

We claim:

1. A method for generating a high energy region which may be used to carry out reactions requiring high energy at a controlled reaction temperature substantially higher than ambient temperature which comprises:

positioning an electrode with a dielectric liquid, each having an electrical resistance, to form an interface having an area and contact resistance wherein said area is sufficiently small to provide that when electrical current is passed through said electrode, interface and dielectric liquid, temperature of said interface will rise to a substantially larger value than said ambient temperature of said electrode and dielectric liquid;

passing electrical current through said electrode, interface and liquid causing said temperature of said interface and a volume of said electrode adjacent to said interface to increase thereby vaporizing said dielectric liquid adjacent to said interface and increasing said electrical resistance at said interface;

measuring said temperature of said interface and volume;

continually adjusting said position of said electrode to vary said contact resistance is operable combination with said measuring step to provide that said temperature of said interface is maintained substantially equal to said reaction temperature and causing said area of contact to erode to form a powder in combination with said combining element.

2. A method as in claim 1 wherein said dielectric liquid is water.

3. A method as in claim 2 wherein said water contains dissolved compounds.

4. A method for generating a submicron sized powder composed of particles having a predetermined atomic ratio of a first element to at least one other combining element which comprises;

dissolving into a dielectric liquid a predetermined quantity of compound containing said combining element producing a predetermined concentration of ions of said combining element in said dielectric liquid wherein said predetermined concentration is operably selected to provide said predetermined atomic ratio and maintaining said predetermined concentration during powder generation;

positioning an electrode having an electrical resistance and composed of said first element to form an area of contact with said dielectric liquid;

impressing a voltage to pass electrical current between said electrode and said dielectric liquid;

adjusting said electrode to a position to provide that said area of contact is sufficiently small such that electrical resistance of said area is large compared to said electrode resistance thereby raising the temperature of said contact area and causing said contact area to erode to form said powder in combination with said combining element.

5. A method as in claim 4 wherein:
said voltage is about 500 volts
said dielectric liquid is water;
said first element is iron;
said compound is Barium Hydroxide;
said combining element is Barium;
said powder has a particle diameter between 10 and 100 nanometers.

* * * * *